Dec. 12, 1933.  O. FUCHS  1,939,116
PROCESS FOR THE CONTINUOUS PRODUCTION OF ESTERS OF ETHYL ALCOHOL
Filed July 7, 1930  2 Sheets-Sheet 1
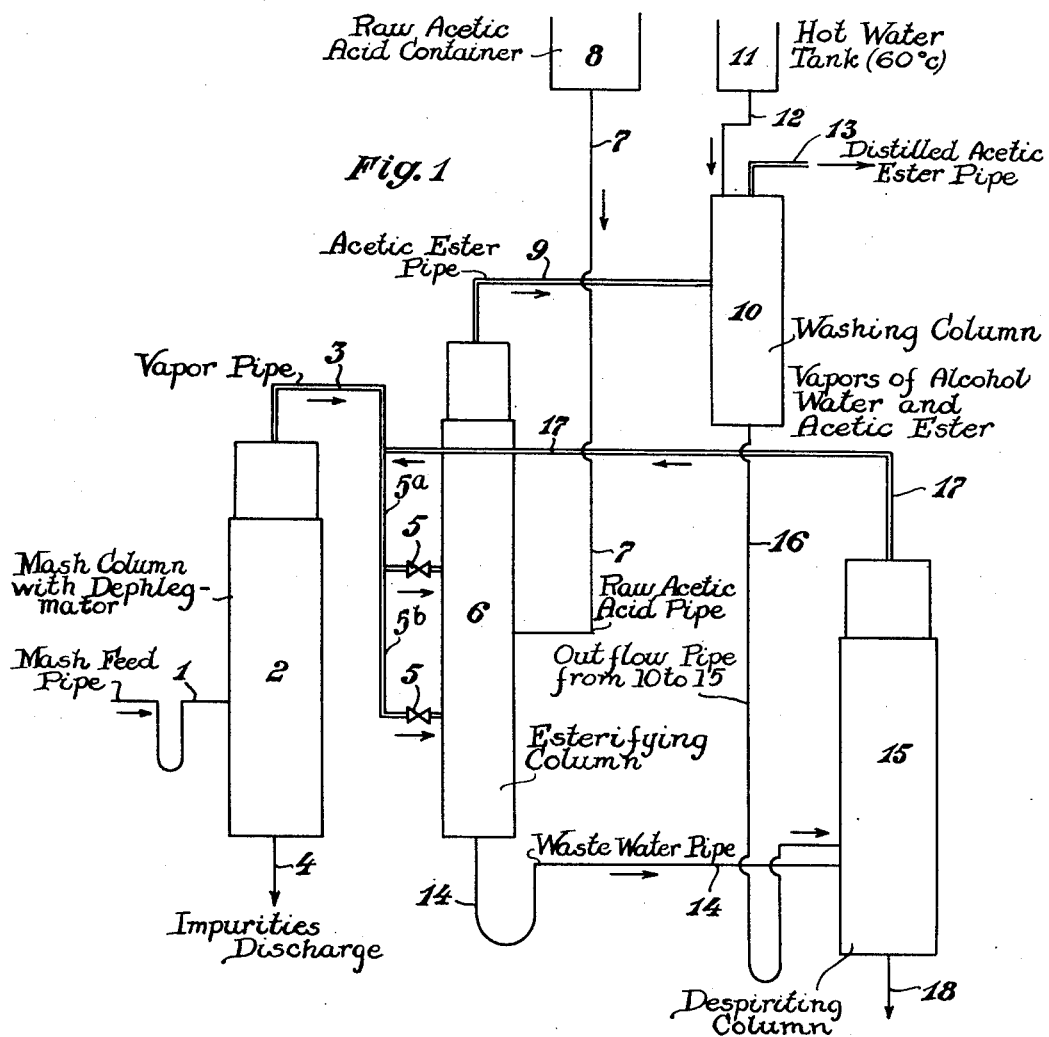

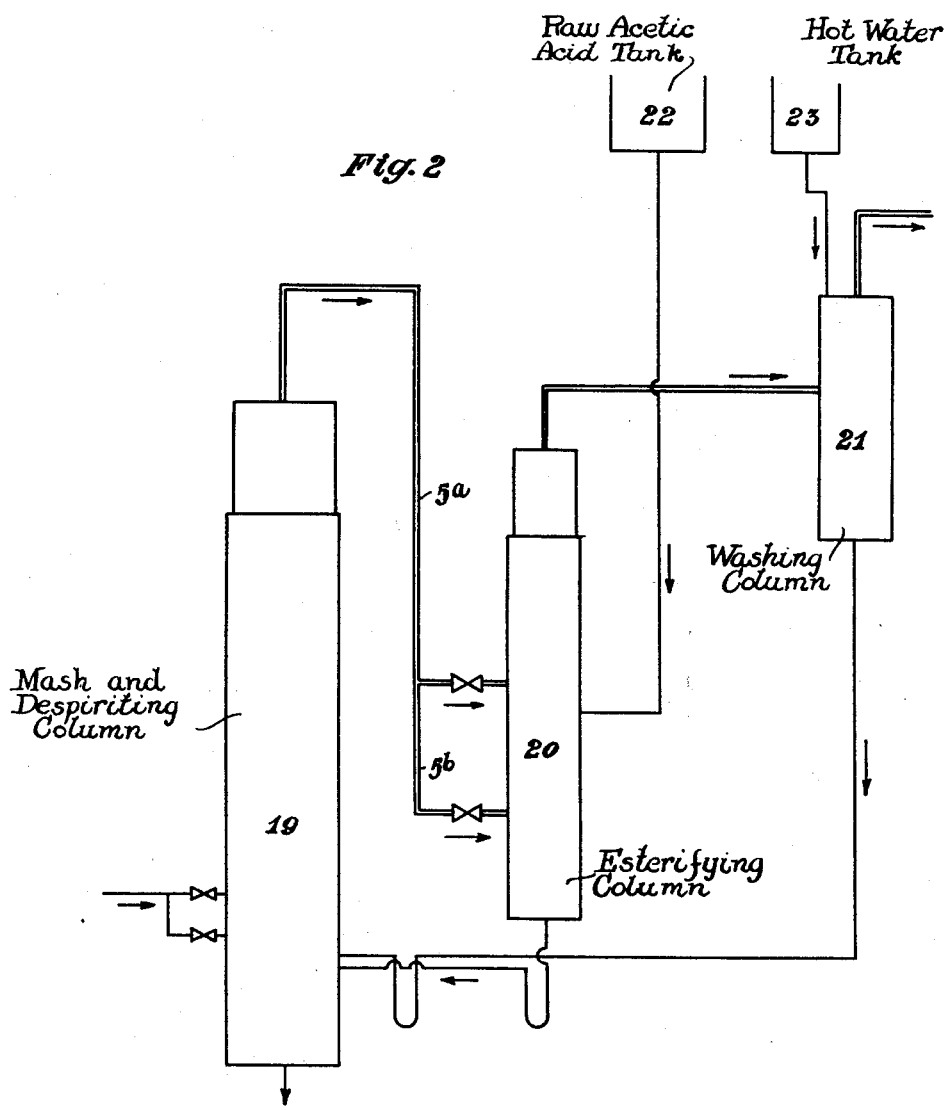

Patented Dec. 12, 1933

1,939,116

UNITED STATES PATENT OFFICE 1,939,116

PROCESS FOR THE CONTINUOUS PRODUCTION OF ESTERS OF ETHYL ALCOHOL

Otto Fuchs, Constance, Germany, assignor, by mesne assignments, to firm of Deutsche Gold- und Silber-Scheideanstalt vormals Roessler, Frankfort-on-the-Main, Germany, a corporation of Germany Application July 7, 1930, Serial No. 466,293, and in Germany July 23, 1929

8 Claims. (Cl. 260—106)

The production of ethyl alcohol is generally effected in such a manner that the vapor mixture passing off, when de-spiriting mashes, is treated so as to form concentrated pure alcohol and this is then, preferably after previous denaturing, supplied for use.

The present invention relates to a process for subjecting the alcohol-vapor mixture passing off when de-spiriting mashes, to direct chemical treatment. According to the invention this is effected in such a manner that the alcohol-vapor mixture passing off when de-spiriting mashes is introduced directly, whilst adding the necessary quantity of acid, particularly acetic acid, into a column system on which successive esterification, removal of excess alcohol from the ester and further circulation of the unconsumed alcohol, are continuously combined. The esterification as such may in this case take place if desired with the addition of mineral acid or in the presence of other suitable esterifying catalysts.

It has been found, that when using the process according to the present invention the concentrating and purifying process, previously used for the ethyl alcohol, may be omitted. If desired the operation may be restricted to the elimination of a few undesirable impurities, particularly high boiling products.

The water vapor accompanying the alcohol does not cause any disturbance in the process. When carrying out the process it is possible to use if desired also diluted acid, for example highly diluted acetic acid, as is frequently available, as for example in the form of raw pyroligneous acid from the distillation of wood, in the form of products of fermentation processes or in the form of waste acid, so that a valuable final product (acetic ester) is obtained from two inexpensive initial materials.

Admixtures as for example methyl alcohol, which when treating certain mashes, for example mashes obtained from sulphite liquor, is always present in a small percentage, need not be removed. The methyl alcohol present is converted into methyl acetate in the course of the esterification process, this methyl acetate, according to the purpose of use of the acetic ester, being allowed to remain therein or being capable of being conveniently separated therefrom as first runnings during rectification. Higher boiling alcohols such as propyl, isobutyl, amyl alcohol, present in the vapor mixture, are also esterified at the same time so that it is also possible to neglect separation of these constituents from the raw material. These constituents are converted into the corresponding esters practically without loss, these esters being then capable of being recovered from the last runnings of the ethyl ester.

The invention is preferably carried out in such a manner that the ethyl alcohol, which by being passed once through the esterifying apparatus is not completely converted, circulates through the apparatus until completely esterified, so that on one side of the apparatus there enters only the alcohol-containing vapors from the de-spiriting and the added acid, whilst on the other side there passes out the final product (ethyl acetate) free from unchanged ethyl alcohol in quantities which in practice correspond with the ethyl alcohol driven off from the mash.

According to one method of carrying the invention into effect the de-spiriting of the mash and the de-spiriting of the alcohol-containing liquids circulating continuously in the process are effected in one and the same column, the different liquids, according to their alcohol content, being introduced into the column at different heights.

The process according to the present invention may for example be carried out in an apparatus as illustrated diagrammatically in Figure 1 of the accompanying drawings.

The mash enters the column 2 through a pipe 1, and in the column volatile constituents are separated and after passing through a dephlegmator pass out through the pipe 3 in the form of vapor. They are composed of ethyl alcohol, water vapor and small quantities of acetic ether and the higher alcohols, propyl alcohol, isobutyl, isoamyl alcohol and so forth which in other processes are separated in the form of fusel oil. If the mash contains aldehyde in large quantities, then by inserting a first runnings column (not shown) before the column 2 this aldehyde can be conveniently separated continuously. The suspended and dissolved non-volatile impurities of the mash pass out from the bottom of the column 2 through the pipe 4 together with a portion of the water. The mixture of vapors passes through the pipes 5a and 5b or through a number of pipes in a similar arrangement into the esterifying column 6 into which same column is fed through a pipe 7, if desired under distribution on several plates, the raw acetic acid to be esterified from a container 8, placed at a high level, if desired with the addition of the quantity of mineral acid necessary for catalysis. The acetic ester produced passes out in the form of vapor, from the column 6 through the pipe 9, together with suitable quantities of acetic ester of higher alcohols, also a portion of free ethyl alcohol, always maintained in excess in the column 6, and water vapor.

They enter the washing column 10 into which there flows from a tank 11, at a high level, through the pipe 12 hot water (of about 60° C.) in such a manner that there is distilled from the column 10 through the pipe 13 the acetic ester free from alcohol, whereupon further treatment and separation from the homologous esters, that is acetic esters of higher alcohol can be effected continuously or non-continuously in the known manner.

From the bottom of the column 6 there passes out through the pipe 14 the waste water which contains acetic acid in a quantity of only a few tenths percent, but excess ethyl alcohol in large quantities. It passes through the pipe 14 into the de-spiriting column 15. Into this column also passes the outflow from the washing column 10 through the pipe 16. In this de-spiriting column 15 these liquors are freed from all volatile organic substances and the vapor mixture, mainly consisting of alcohol and water vapor, together with small quantities of acetic ester, from the outflow of the washing column, passes through the pipe 17 again into the pipe 3 and through the distributing pipes 5a and 5b and so forth into the esterifying column 6. The de-spirited liquors leave the de-spiriting column 15 at the bottom through the pipe 18.

The diagram illustrated in Figure 2 of the accompanying drawings shows a somewhat simplified arrangement which is obtained when the columns 2 and 15 shown in the diagram in Figure 1 and having substantially the same function are replaced by a single column 19 which de-spirits both the mash and the liquors from the esterifying and the washing columns. The unaltered parts of the apparatus have the same function as in Figure 1, 20 is the esterifying column, 21 is the washing column for removing the excess alcohol from the ester, 22 and 23 are the tanks at a high level for the raw acetic acid and for the hot water respectively.

The invention permits of obtaining from 100 kg ethyl alcohol in the mash 175 kg and more ethyl acetate. To this must also be added the yield in other esters such as methyl, propyl, isobutyl, amyl acetates and so forth.

*Example*

For treatment there is used a sulphite liquor having a content of 1,1 percent by volume of ethyl alcohol, 0,04 percent by volume of methyl alcohol and the corresponding quantities of fusel alcohol. There are treated daily 77000 kg which correspond to a quantity of 700 kg alcohol. When effecting esterification with commercial 60 percent acetic acid there are obtained daily 1300 kg raw acetic ester which by rectification are separated into (a) 50 kg low boiling solvents which for the most part consist of methyl acetate.

(b) 35 kg acetic ester first runnings with a moderate content of ethyl alcohol. This fraction is again returned into the process.

(c) 1150 kg pure ethyl acetate.

(d) .30 kg last runnings consisting of esters of the higher alcohols and propionic acid esters, propionic acid being a common impurity of the commercial acetic acid.

In the term "mashes" in the claims is included all alcoholic liquids obtained through fermentation, independent of what kind of carbo-hydrates are used as starting materials for the alcohol.

I claim:

1. A process for the production of esters comprising de-spiriting mashes by distillation, then esterifying directly the resulting vaporous mixtures which contain alcohol and water with aliphatic mono-carboxylic acid without previous condensation.

2. A process according to claim 1 in which acetic acid is used for the esterification.

3. A process according to claim 1 in which aldehyde is separated from the mixture containing alcohol used for esterification.

4. A process according to claim 1 in which said acid is diluted.

5. A process according to claim 1 in which said vaporous mixture containing alcohol and water is introduced into a column system wherein occur the following steps, first the esterification of the alcohol by the presence of said acid, then the separation of the ester formed from the unconsumed alcohol, then the return of the unconsumed alcohol into the esterification column, the alcohol being kept in circulation by the foregoing steps until said ester has been freed from alcohol.

6. A process according to claim 1 in which said vaporous mixture containing alcohol and water is introduced into a column system wherein occur the following steps, first the esterification of the alcohol by the presence of said acid, then the separation of the ester formed from the unconsumed alcohol, then the return of the unconsumed alcohol into the esterification column, the de-alcoholization of the mashes and the de-spiriting of the alcoholic liquids being effected in the same column during continuous circulation by the said steps.

7. A process according to claim 1 in which said vaporous mixture containing alcohol and water is introduced into a column system wherein occur the following steps, first the esterification of the alcohol by the presence of said acid, then the separation of the ester formed from the unconsumed alcohol, then the return of the unconsumed alcohol into the esterification column, the de-alcoholization of the mashes and the de-spiriting of the alcoholic liquids being effected in the same column during continuous circulation by the said steps, said alcoholic liquids being returned into the zones of said column where a liquid of about the same alcohol-content is to be found.

8. A process according to claim 1 in which said vaporous mixture containing alcohol and water is introduced into a column system wherein occur the following steps, first the esterification of the alcohol by the presence of said acid, then the separation of the ester formed from the unconsumed alcohol, then the return of the unconsumed alcohol into the esterification column, the de-alcoholization of the mashes and the de-spiriting of the alcoholic liquids being effected in the same column during continuous circulation by the said steps, said unconsumed alcohol being withdrawn as wash water and waste water, then conducted to a de-spiriting column where the alcohol is recovered and then returned to the esterification column.

OTTO FUCHS.